(12) United States Patent
Schwenk

(10) Patent No.: US 6,222,923 B1
(45) Date of Patent: Apr. 24, 2001

(54) METHOD FOR SECURING SYSTEM PROTECTED BY A KEY HIERARCHY

(75) Inventor: Joerg Schwenk, Dieburg (DE)

(73) Assignee: Deutsche Telekom AG, Bonn (DE)

(*) Notice: Subject to any disclaimer, the term of this patent is extended or adjusted under 35 U.S.C. 154(b) by 0 days.

(21) Appl. No.: 08/990,446

(22) Filed: Dec. 15, 1997

(51) Int. Cl.[7] .................................................... H04L 9/00
(52) U.S. Cl. ............................ 380/44; 380/277; 380/281; 380/284; 380/285; 713/150; 713/200; 713/171
(58) Field of Search ................................ 380/45, 10, 21, 380/59, 277, 281, 283, 284, 285, 44; 713/200, 150, 171

(56) References Cited

U.S. PATENT DOCUMENTS

| 4,613,901 | * | 9/1986 | Gilhousen et al. | 358/122 |
| 5,220,604 | * | 6/1993 | Gasser et al. | 380/23 |

* cited by examiner

Primary Examiner—Tod R. Swann
Assistant Examiner—Paul E. Callahan
(74) Attorney, Agent, or Firm—Kenyon & Kenyon

(57) ABSTRACT

A method for securing a system protected by a predefined hierarchy of cryptographic keys, and in particular, for securing a pay TV system, against unauthorized users. An individual cryptographic key assigned to a dishonest customer is determined by forming the intersection of at least two predefined subsets formed at different points in time and pertaining to the same hierarchical level.

10 Claims, 4 Drawing Sheets

```
┌──────────────────────────────────────────────┐
│ assigning an individual cryptographic key to │   102
│ each system user on a lowest hierarchical    │
│ level                                        │
└──────────────────────────────────────────────┘
                     │
┌──────────────────────────────────────────────┐
│ storing the individual cryptographic keys    │   104
│ in the storage device                        │
└──────────────────────────────────────────────┘
                     │
┌──────────────────────────────────────────────┐
│ forming at least one higher hierarchical     │
│ level of cryptographic keys at predefined    │
│ discrete points in time using a process      │
│ which includes: combining cryptographic keys │
│ of an immediately lower hierarchical level   │
│ in a plurality of subsets of a predefined    │   106
│ size, an assigned cryptographic key being    │
│ assigned to each subset; transmitting the    │
│ assigned cryptographic keys using the        │
│ respective immediately lower hierarchical    │
│ level cryptographic keys; and storing the    │
│ assigned cryptographic keys in the storage   │
│ device; and                                  │
└──────────────────────────────────────────────┘
                     │
┌──────────────────────────────────────────────┐
│ determining a certain individual crypto-     │
│ graphic key assigned to a user by forming a  │
│ set intersection of at least one of the      │   108
│ plurality of subsets with another subset     │
│ formed at a different time and pertaining to │
│ the same hierarchical level                  │
└──────────────────────────────────────────────┘
```

METHOD FOR SECURING SYSTEM PROTECTED BY A KEY HIERARCHY

FIELD OF INVENTION

The present invention relates to a method of securing a system protected by a predefined hierarchy of cryptographic keys, and in particular, for securing a pay TV system, against unauthorized users.

RELATED TECHNOLOGY

A key hierarchy is used in many fields of application to derive a common key for a large number of users from the customers' individual cryptographic keys. A pay TV system is a typical application. With the help of a key hierarchy, the permission to receive a pay TV program can be granted selectively to certain customers only. One possible key hierarchy has the form of a tree structure. On the lowest hierarchical level, each potential customer initially has a chip card or other security module on which a unique key assigned to that customer is stored. The pay TV operator stores all these individual cryptographic keys in a central storage device.

The key hierarchy is built up gradually in that the keys of the lowest level are initially combined into a plurality of subsets of a predefined size on the second level. Each subset is assigned a cryptographic group key, which is transmitted with the help of the cryptographic keys of the lowest level forming the respective subset. Subsequently, the subsets of the second level are combined into a number of subsets with each subset of the third level being larger than each subset of the second level. Each subset of the third level is assigned a cryptographic key, which is transmitted with the help of the cryptographic group keys of the second level, forming the respective subset. This process can be continued until a common key is generated for those customers who are authorized to receive the pay-per-view TV program. Various types of attack on such a system protected by a key hierarchy are conceivable, all of which are based on a dishonest customer knowing his individual key, one or more group keys, or the common key stored on his or another chip card, and forwarding it without authorization to a third party. Three possible types of attack on such a system can be distinguished:

1. The dishonest customer copies the common key and forwards it without authorization, e.g., on a pirate chip card, to other individuals. This type of attack can be averted by the system operator generating the cryptographic keys regenerating the common key in appropriately selected time intervals.
2. A dishonest customer copies his individual cryptographic key and forwards it without authorization to other individuals. In this case the customer can be barred from the use of the system in a relatively simple manner if the individual key that has been copied, e.g., onto a pirate card, is recognized, since there is a unique relationship between the individual cryptographic key and the respective individual.
3. A dishonest customer copies a group key and forwards it to third parties. In this case, the dishonest customer cannot be uniquely identified using the group key that has been copied. The system operator must either bar all customers of the group identified by the group key from the use of the system or tolerate the misuse by the group key that has been copied.

SUMMARY OF THE INVENTION

The object of the present invention is therefore to provide a method to more effectively protect a system protected by a key hierarchy against unauthorized users.

At the lowest level of the key hierarchy, an individual cryptographic key is assigned to each potential system user; this key may be handed out as a chip card or other security module. The individual cryptographic keys of each user are stored in a storage device of the system. At predefined time intervals, at least one higher hierarchical level of cryptographic keys is subsequently formed through the following steps: the cryptographic keys of the immediately lower hierarchical level are combined into a plurality of subsets of a predefined size in any fashion with a cryptographic key assigned to each subset; this cryptographic key is transmitted with the help of the cryptographic keys forming the respective subset and subsequently stored in the storage device. Then at least one individual cryptographic key assigned to a suspected user is determined by forming the intersection of at least two predefined subsets formed at different times and pertaining to the same hierarchical level.

Instead of rebuilding the higher hierarchical levels at predefined discrete points in time, different key hierarchies can be generated simultaneously for different system operators. Each key hierarchy has at least one higher hierarchical level of cryptographic keys. A higher hierarchical level is formed by combining the cryptographic keys of the immediately lower hierarchical level in any desired fashion into several subsets of predefined size, with a cryptographic key, generated from the cryptographic keys forming the respective subset and then stored, assigned to each subset. Thereafter at least one cryptographic key, assigned to a suspected user, is determined by forming the intersection of at least two predefined subsets pertaining to the same hierarchical level of two different key hierarchies.

Increasingly larger subsets can be successively formed, according to the number of hierarchical levels, to implement this method. A key hierarchy of a tree-type structure would be one possible example. A particularly efficient method, however, is the use of geometric structures to combine cryptographic keys into subsets of a predefined size. Geometric structures have the advantage that the characteristics of forming the intersections of different subsets can be very well described.

A key hierarchy generated for a plurality of customers can preferably be implemented with the help of a d-dimensional finite affine space $AG(d,q)$ using body $GF(q)$ (see A. Beutelspacher, "Einführung in die endliche Geometrie I & II" [Introduction to Finite Geometry I & II], BI Wissenschaftsverlag 1982, and A. Beutelspacher and U. Rosenbaum, "Projektive Geometrie" [Projective Geometry], Vieweg Verlag, 1992).

The intersection can be even more easily formed if the geometric structure is a d-dimensional finite projective space $PG(d,q)$ with body $GF(q)$.

BRIEF DESCRIPTION OF THE DRAWINGS

The present invention is explained in detail below with reference to several embodiments illustrated in the drawings, in which.

DETAILED DESCRIPTION

Figure 5:
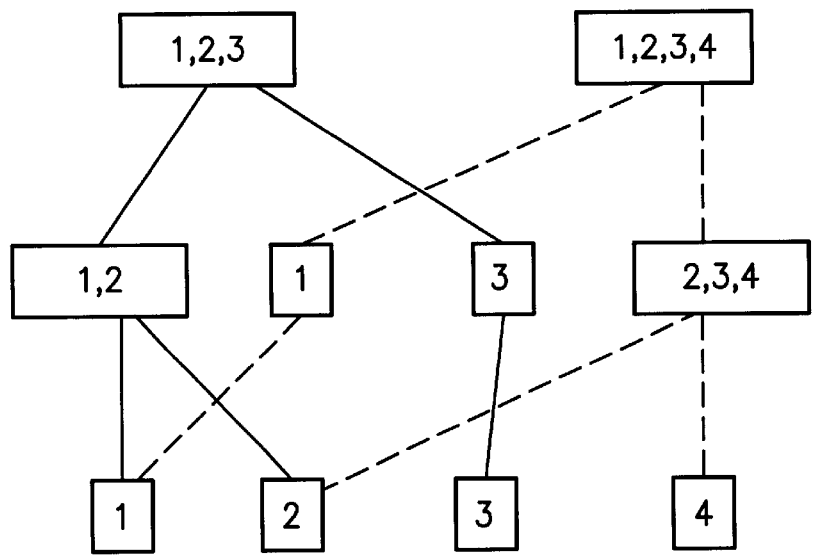
FIG. 5 shows two different key hierarchies existing at the same time.
Figure 6:
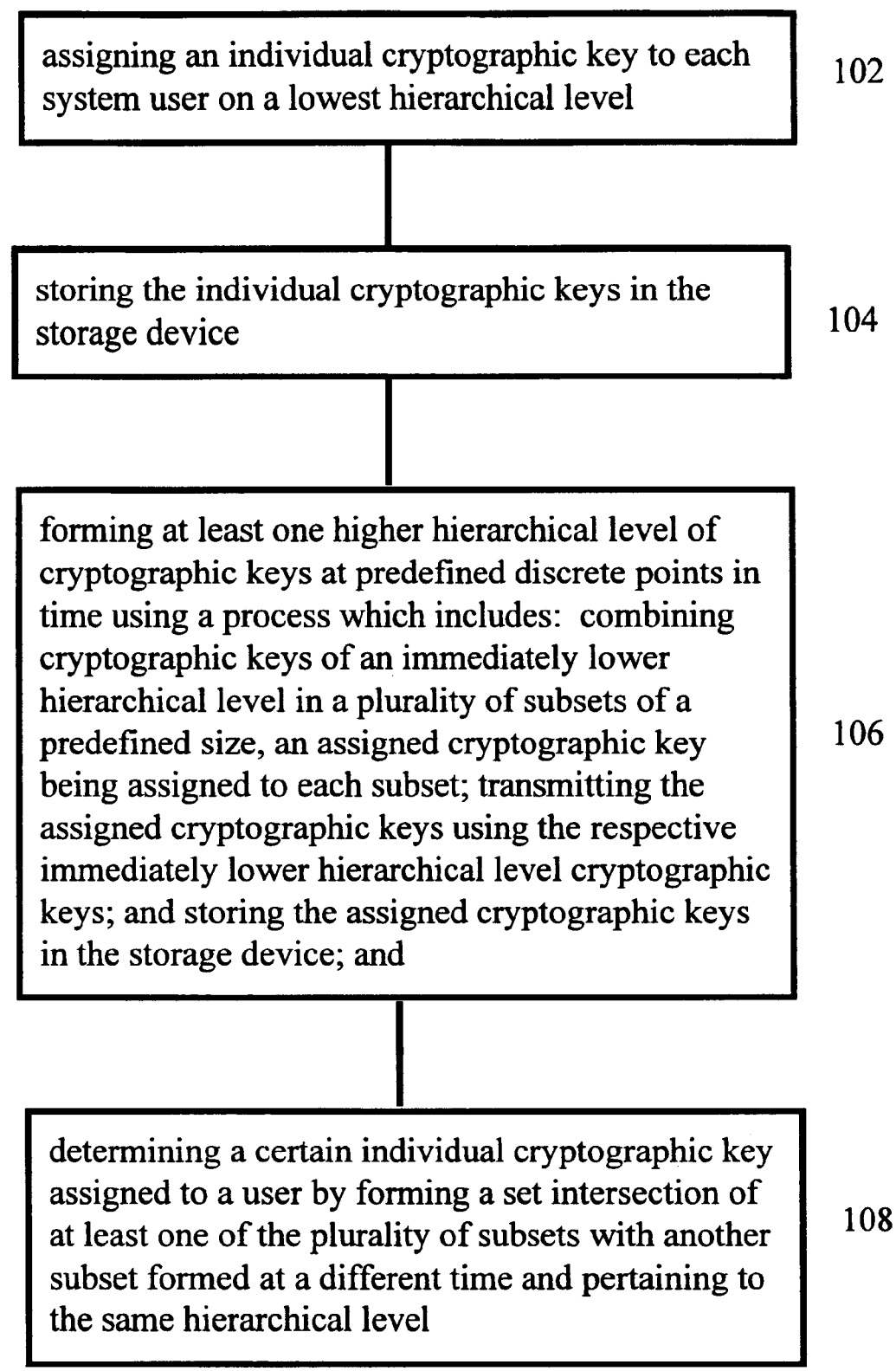
FIG. 6 shows a flowchart of a method in accordance with the present invention.

FIG. 5 shows a flowchart of a method in accordance with the present invention. An individual cryptographic key is assigned to each system user on a lowest hierarchical level, as shown in block 102. The individual cryptographic keys are stored in a system storage device, as shown in block 104. At least one higher hierarchical level of cryptographic keys is formed at predefined discrete points in time using a process which includes: combining the cryptographic keys of the immediately lower hierarchical level in a plurality of subsets of a predefined size, a cryptographic key being assigned to each subset; transmitting the cryptographic key assigned to each subset using the cryptographic keys forming the respective subset; and storing the cryptographic key assigned to each subset in the storage device, as shown in block 106. As shown in block 108, an individual cryptographic key assigned to a user is determined by forming a set theory intersection of at least two predefined subsets formed at different times and pertaining to the same hierarchical level.

Figure 1:
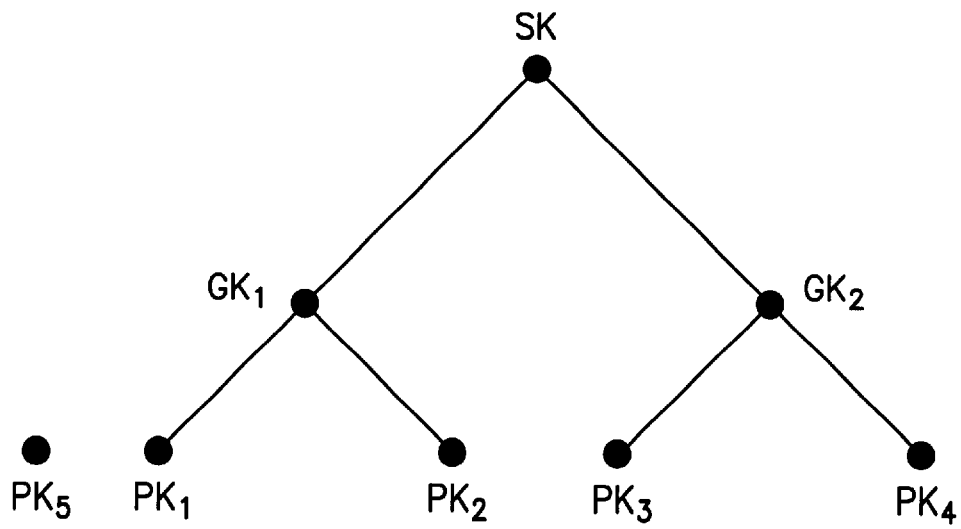
FIG. 1 shows a key hierarchy for four authorized users in a tree-type structure formed at time 1.

FIG. 1 shows a tree-type key hierarchy for a pay TV system, comprising five customers, for example. Each customer i receives an individual cryptographic key $PK_i$, situated on the lowest hierarchical level, from a system operator or pay TV program provider. The lowest hierarchical level thus includes five individual cryptographic keys $PK_1$–$PK_5$. The operator stores these keys in a central storage device. With the help of the tree-type structure used, it is now possible to allow selected customers to receive a pay TV program.

For example, let us assume that only customers 1, 2, 3, and 4 are authorized to receive the TV program, but not customer 5. In order to achieve this distribution of authorizations, customers 1 through 4 are grouped in the next higher hierarchical level—i.e., the second level preferably to form two subsets with two customers each. In practice this is accomplished by first generating group keys $GK_1$ and $GK_2$ for the two subsets at a central location. Group key $GK_1$ is transmitted with the help of the two individual cryptographic keys $PK_1$ and $PK_2$ of customers 1 and 2, whereas group key $GK_2$ is transmitted with the help of the two individual cryptographic keys $PK_3$ and $PK_4$ of customers 3 and 4.

Customers 1 and 2 can calculate group key $GK_1$ with their individual cryptographic keys $PK_1$ and $PK_2$, whereas customers 3 and 4 can calculate group key $GK_2$ with their individual cryptographic keys $PK_3$ and $PK_4$. Customer 5, on the other hand, cannot decode either of the two group keys. On the highest hierarchical level—here level 3—a full set, containing both subsets of the immediately lower level 2 and therefore the four authorized customers, is formed. For this purpose, the central location transmits a common key SK with the help of the two group keys $GK_1$ and $GK_2$ of the second level. Since the pay TV program broadcast by the provider is encoded with the common key SK, customers 1 through 4 can decode and receive the program, but customer 5 cannot. The key hierarchy illustrated in FIG. 1 includes three hierarchical levels as an example.

The present invention is now concerned with the problem of making it possible to identify a dishonest customer who has copied a group key $GK_1$ or $GK_2$ and resold it to third parties without authorization. The dishonest customer can sell the "stolen" group key in the form of a pirate chip card or offer it under an e-mail address. Let us assume that customer 4 is the dishonest customer, hereinafter also referred to as a pirate, who has copied group key $GK_2$ previously distributed by the central location and resold it to third parties. When the system operator obtains the copied group key $GK_2$, he cannot uniquely identify the pirate because group key $GK_2$ is assigned to both customers 3 and 4.

Figure 2:
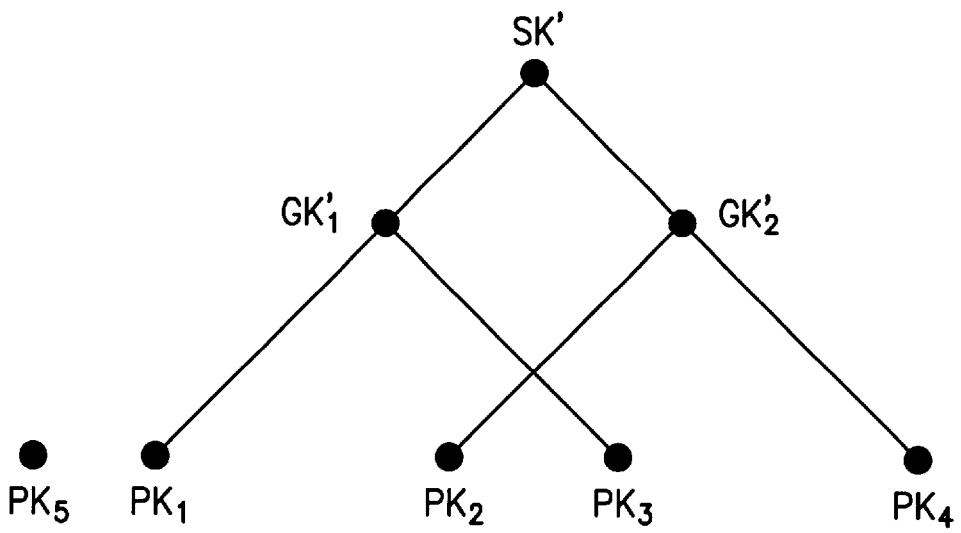
FIG. 2 shows a key hierarchy according to FIG. 1, but formed at time 2.

The object of the invention is now to find the dishonest customer 4 in the subset of customers identified by group key $GK_2$. For this purpose, the suspect subset is stored, with the cryptographic key $GK_2$ assigned to it, at the central location. At a predefined time, the central location gene rates a new key hierarchy, which is shown in FIG. 2. For this purpose, two new subsets are arbitrarily formed, including customers 1, 3, and 2, 4, respectively. The new subsets are formed at the central location by generating new group keys $GK_1'$ and $GK_2'$ for the two subsets. In addition, a new common key SK' is also generated. The procedure for generating the group key and a common key has already been explained in detail previously. The newly generated cryptographic keys are sent out to the individual customers again and stored at the central location. The pirate, who is customer 4 in our case, is now forced to copy the new group key $GK_2'$ and distribute it to third parties. As soon as the central location obtains the copied group key $GK_2'$, it is stored again in the central storage device. Subsequently the intersection of the subset to which the cryptographic group key $GK_2$ is assigned and the subset to which the cryptographic group key $GK_2'$ is assigned is determined. Since the subset formed at time 1 (see FIG. 1) contains customers 3 and 4, and the subset formed at time 2 (see FIG. 2) contains customers 2 and 4, the dishonest customer 4 results as the intersection. The central location now knows the identity of the dishonest customer and can bar him from using the system, for example, by blocking his individual cryptographic key $PK_4$. Although the key hierarchies illustrated in FIGS. 1 and 2 include only four customers, key hierarchies of any size can be used, in which case, of course, the cost of finding a dishonest customer also increases, since the number of groups is greater.

Figure 3:
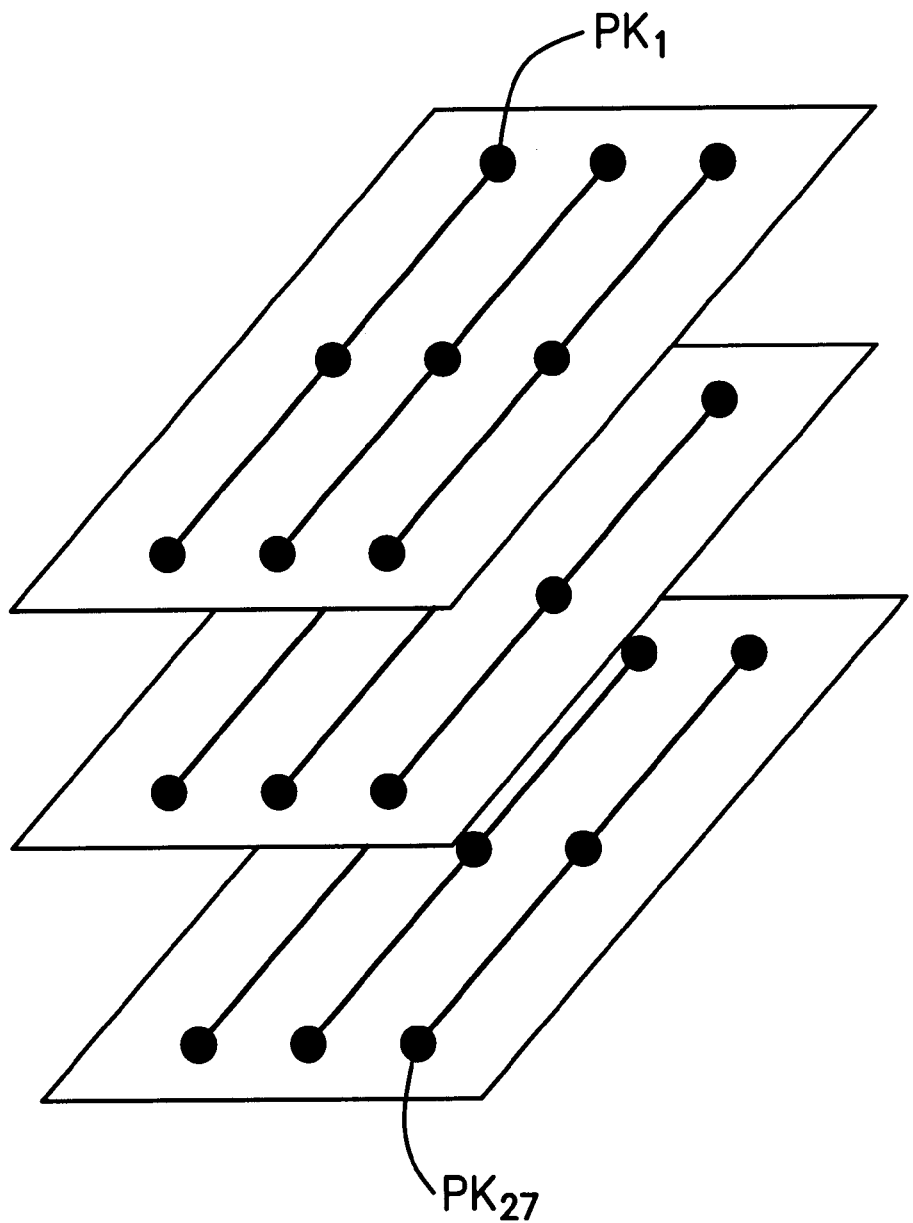
FIG. 3 shows a key hierarchy for 27 subscribers of the affine space $AG(3,3)$ formed at time 1.
Figure 4:
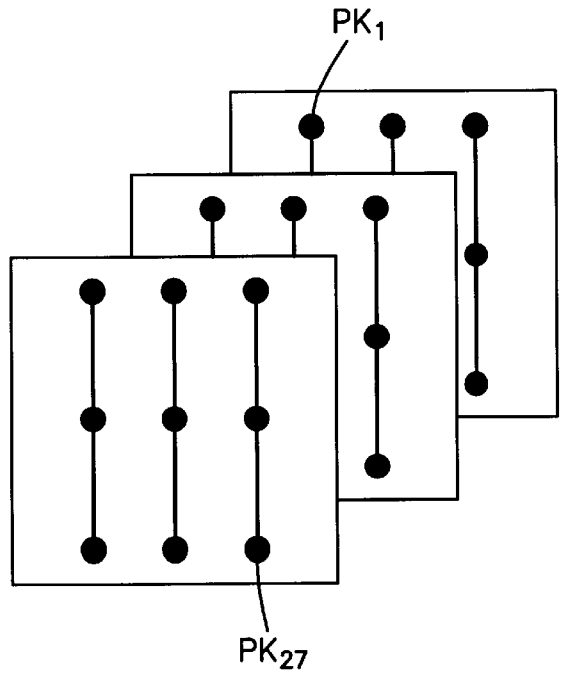
FIG. 4 shows a key hierarchy according to FIG. 3, but generated at time 2.

FIGS. 3 and 4 show two subset hierarchies formed at different times; these subsets can be described with the help of the 3-dimensional finite affine space AG(3,3) using body GF(3). The affine space illustrated in FIGS. 3 and 4 has 27 points, which correspond to the potential pay TV customers. It is advantageous to implement the subset hierarchy with the help of the finite affine space, since it allows the characteristics of the formation of the intersection of different subsets to be described very accurately. FIG. 3 shows the hierarchy formed at time 1. Each customer is provided with an individual cryptographic key $PK_1$ through $PK_{27}$. It can now be conceived that a cryptographic key of the respective customer is assigned to each point of the affine space. The 27 points can be successively combined into subsets of three and nine points by initially selecting nine parallel straight lines and then three parallel planes, which must be compatible with the straight lines. In other words, the straight lines must always be fully contained in one of the three planes. If this structure is transferred to a key hierarchy, the individual points are located on the lowest level, the straight lines on the second level, and the three planes of the affine space on the third level, with the highest hierarchical level containing the entire space that includes the individual points, the nine straight lines, and the three planes. Group keys are generated at the central location, by the method described in detail previously, for each straight line and each plane of the affine plane, and a common key is generated that includes all customers.

The advantage offered by the geometric structures and, in particular, of affine spaces, consists of the fact that the number of subsets (straight lines or planes) that must be known in order to determine a given point can be exactly established. Thus, for example, two non-parallel planes of an affine space intersect in exactly one straight line, and three pairwise non-parallel planes intersect in exactly one point. For example, in order to determine the individual key of a pirate who has copied and resold the group key of a plane (which corresponds to a group of nine individuals) of the affine space, it is sufficient to divide the affine space into new planes at three different points in time so that the planes are not parallel to one another. In other words, if one dishonest customer is to be found out of 27 customers, in addition to the hierarchies formed at different times (FIGS. 3, 4), a third hierarchy must be generated at a third point in time. If the three pairwise non-parallel planes, to each of which one given group key is assigned, intersect, a common point of intersection is obtained, which corresponds to the dishonest customer. The central location must now cause the individual cryptographic key of the dishonest customer to be blocked.

The process to find a dishonest customer by forming intersections is even simpler if finite projective spaces are used instead of finite affine spaces, since here no distinction needs to be made between parallel and non-parallel structures. The above-described procedure can also be used if a dishonest customer copies several individual keys and uses them alternately. In this case, however, more hierarchies must be formed at different times. For example, if a pirate knows two out of nine individual cryptographic keys, the affine space must be divided again into parallel straight lines a total of three times so that incorrect identification of a suspected subscriber can be ruled out and one of the two keys is identified.

Instead of having to form several key hierarchies at predefined points in time in order to identify the individual key of a pirate, it is also conceivable that different key hierarchies may exist simultaneously. FIG. 5 shows two different key hierarchies. Several key hierarchies existing at the same time are recommended when several service providers share a customer chip card. Let us assume that customer 2 has copied and resold group key 10 containing two customers 1 and 2 of one service provider and group key 20 containing customers 2, 3, and 4 of another service provider. In this case, the dishonest customer can be identified again by forming the intersection of the respective subsets 10 and 20. As can be seen from FIG. 5, for example, the subsets of the same hierarchical levels do not necessarily have to be the same size.

What is claimed is:

1. A method for securing at least one system protected by a predefined hierarchy of cryptographic keys against unauthorized users by determining a certain individual cryptographic key assigned to a user, the at least one system including a storage device, the method comprising:

assigning an individual cryptographic key to each system user on a lowest hierarchical level;

storing the individual cryptographic keys in the storage device;

forming at least one higher hierarchical level of cryptographic keys at predefined discrete points in time using a process which includes: combining the cryptographic keys of an immediately lower hierarchical level into a plurality of subsets of a predefined size, an assigned cryptographic key being assigned to each subset; transmitting the assigned cryptographic keys using the respective immediately lower hierarchical level cryptographic keys; and storing the assigned cryptographic key in the storage device; and determining the certain individual cryptographic key assigned to a user by performing a set intersection of at least one of the plurality of subsets with another subset formed at a different time and pertaining to a same hierarchical level.

2. The method as recited in claim 1 wherein the at least one system is a pay TV system.

3. The method as recited in claim 1 wherein the combining of the cryptographic keys into the plurality of subsets of the predefined size is determined by finite geometric structures.

4. The method as recited in claim 3 wherein each finite geometric structure is a d-dimensional finite affine space AG(d,q) over a body GF(q).

5. The method as recited in claim 3 wherein each finite geometric structure is a d-dimensional finite projective space PG(d,q) over a body GF(q).

6. A method for securing at least one system protected by a predefined hierarchy of cryptographic keys against unauthorized users by determining a certain individual cryptographic key assigned to a user, the at least one system including a storage device, the method comprising:

assigning an individual cryptographic key to each system user on a lowest hierarchical level;

storing the individual cryptographic keys in the storage device;

forming at least two higher hierarchical levels of cryptographic keys at the same time for the at least one system using a process which includes: combining the cryptographic keys of an immediately lower hierarchical level into a plurality of subsets of a predefined size, an assigned cryptographic key being assigned to each subset; transmitting the assigned cryptographic keys using the respective immediately lower hierarchical level cryptographic keys; and storing the assigned cryptographic key in the storage device; and determining the certain individual cryptographic key assigned to a user by performing a set intersection of at least one of the plurality of subsets with another subset pertaining to a same hierarchical level of different key hierarchies of the at least one system.

7. The method as recited in claim 6 wherein the at least one system is a pay TV system.

8. The method as recited in claim 6 wherein the combining of the cryptographic keys into the plurality of subsets of the predefined size is determined by finite geometric structures.

9. The method as recited in claim 6 wherein each finite geometric structure is a d-dimensional finite affine space AG(d,q) over a body GF(q).

10. The method as recited in claim 6 wherein each finite geometric structure is a d-dimensional finite projective space PG(d,q) over a body GF(q).

* * * * *

UNITED STATES PATENT AND TRADEMARK OFFICE
CERTIFICATE OF CORRECTION

PATENT NO.   : 6,222,923 B1
DATED        : April 24, 2001
INVENTOR(S)  : Schwenk It is certified that error appears in the above-identified patent and that said Letters Patent is hereby corrected as shown below:

Column 2,
Line 65, delete "time 2; and" and insert -- time 2; --.

Column 3,
Line 39, delete "level pref-" and insert -- level–pref- --.

Column 4,
Line 13, delete "gene rates" and insert -- generates --.

Signed and Sealed this

Second Day of April, 2002

Attest:

JAMES E. ROGAN
Attesting Officer    Director of the United States Patent and Trademark Office